UNITED STATES PATENT OFFICE.

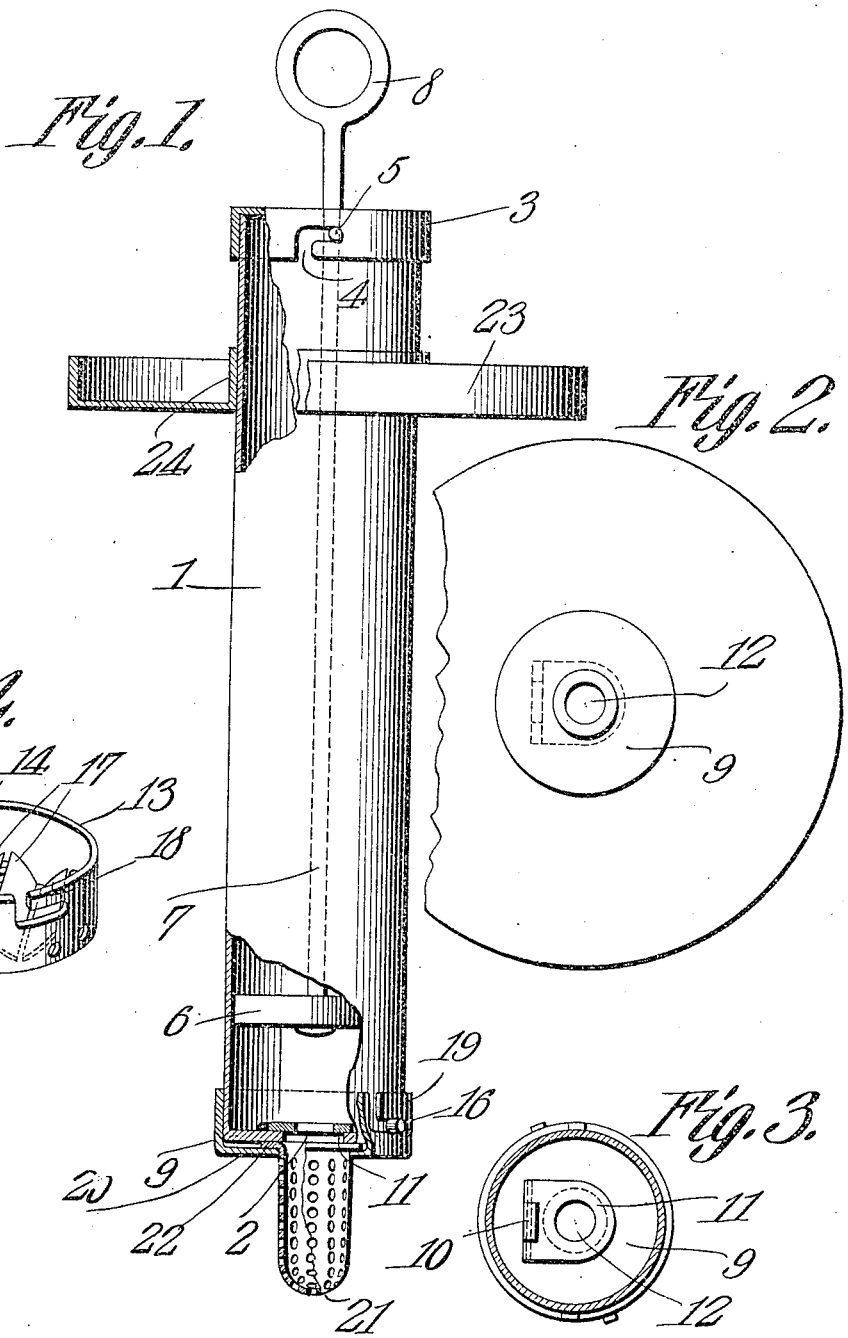

JOHN H. REED, OF LANCASTER, WISCONSIN.

CREAM-PUMP AND EGG-BEATER.

943,892.    Specification of Letters Patent.    Patented Dec. 21, 1909.

Application filed October 24, 1908. Serial No. 459,354.

*To all whom it may concern:*

Be it known that I, JOHN H. REED, a citizen of the United States, residing at Lancaster, in the county of Grant and State of Wisconsin, have invented a new and useful Cream-Pump and Egg-Beater, of which the following is a specification.

This invention relates broadly to suction devices, and has for one of its objects the provision of a device of that kind designed to be fitted to an ordinary milk bottle or similar receptacle for the purpose of separating the cream from the milk.

Another object is to provide an attachment by means of which the device may be readily converted into an egg beater.

A further object is to provide a construction by means of which the inlet to the cylinder will be increased in diameter on the suction stroke and decreased on the exhaust stroke of the piston.

A still further object is to provide an adjustable means to bear on the top edge of a milk bottle or similar receptacle in order to prevent the cylinder from wholly entering the receptacle.

With these and other objects in view as will more fully hereinafter appear the present invention consists in certain novel details of construction and arrangement of parts, hereinafter fully described, illustrated in the accompanying drawings, and more particularly pointed out in the appended claim, it being understood that various changes in the form, proportion, size and minor details of the device may be made without departing from the spirit or sacrificing any of the advantages of the invention.

In the accompanying drawings, forming part of this specification:—Figure 1 is a front elevation of the device, partly broken away at either end and disclosing the bottom valve. Fig. 2 is an end elevation of the bottom of Fig. 1 with the perforated nipple removed. Fig. 3 is a similar view of the opposite face of Fig. 2, and, Fig. 4 is a perspective of the egg beating attachment.

Similar numerals of reference are employed to designate corresponding parts throughout.

In carrying out the invention I provide a hollow cylinder of suitable length and diameter having an opening at the bottom, and interiorly provided with a reciprocating piston and rod. The latter extends through the top of the cylinder and is adapted to raise and lower the piston for the purpose of filling and emptying the cylinder. The lower end of the cylinder is so constructed that one or more attachments may be fitted thereon, thereby enabling the device to act as a spray when fitted with an attachment as shown by Fig. 1, or as an egg beater when provided with the attachment illustrated in Fig. 4.

The cylinder 1, may be of metal, glass, or other suitable material, and when formed of glass may be provided with graduations indicating the mark to which it will be necessary to raise the piston in order that a required amount of liquid may be taken into the cylinder. The upper end of the cylinder is open and the opposite end is provided with a bottom 9 having a central opening 2, through which the cylinder is filled and emptied.

A cap or cover 3 is provided for the open end of the cylinder, and is provided with a right angular slot or recess 4 extending upwardly and laterally from the lower edge of the cap, and which is designed to be turned so as to form a locking engagement with a stud 5 projecting at a right angle from the outer face of the cylinder and disposed adjacent the upper edge thereof, as clearly shown in Fig. 1.

Within the cylinder a piston or plunger 6 is slidingly fitted, and is centrally provided with an opening in which is rigidly secured one end of the plunger or piston rod 7, the opposite end of which extends through a central opening formed in the cap or cover 3, and terminates in an eye portion 8, of a size to receive the finger of the operator. Formed on the inner face of the bottom 9, and beyond the edge of the opening 2 is a pintle lug 10, to which is secured by means of a pintle one end of a gate 11. The diameter of the latter member is considerably greater than that of the central opening 2 of the bottom 9, so that when the gate is parallel to the bottom it will seat over the opening of the latter. An opening 12 coaxial with the opening 2, but of considerably less diameter than the latter is formed in the gate, the function of which will appear later.

By referring now to Fig. 4 it will be seen that a collar 13 is provided with a construction adapted to serve as an egg beater or the like. Formed on one edge of the collar, and diametrically opposite each other are a pair of vertical recesses 14, terminating adjacent the middle of the collar in oppositely extending horizontal recesses 15. The collar is of a size to slidingly fit over the lower end of the cylinder, and the vertical portions of the recess receive a pair of studs 16 formed on the outer face of the cylinder and projecting at right angles thereto. When the collar is turned in one direction the studs 16 will pass into the horizontal portions of the recesses thus locking the collar to the piston.

The collar is interiorly provided with a plurality of angularly disposed blades, the function of which is to cut the yolk of an egg. These blades are preferably of metal, and rectangular in cross section, and the width of each blade is less than the distance between the lower edge of the collar and horizontal portions 15, of the recesses so that when the beater is attached to the cylinder the bottom of the latter will not bear on the blades. In arranging the latter within the collar it is designed that their opposite ends will be secured to the inner face of the collar, and the lower edge of each blade be substantially coincident with the lower edge of the collar. The middle blades 17 are two in number and disposed on either side of the center of the collar. These blades are inclined from the vertical having their upper longitudinal sides lying adjacent and parallel. The end blades 18 are two in number and arranged within the collar outside and parallel to the middle blades, and having their lower sides substantially coincident with the lower edge of the collar, while their upper sides are inclined in opposite directions away from the upper edges of the middle blades. Thus it will be readily seen when this attachment is fitted to the lower end of the cylinder, and inserted in a vessel containing broken eggs, that an upward movement of the piston 6 will, owing to the vacuum created in the cylinder, result in filling the latter with the contents of the vessel. During this movement of the piston it will be observed that the gate 11 has been raised thereby increasing the diameter of the inlet to the cylinder and permitting the same to be filled in considerably less time.

When the piston has reached the limit of its upward movement and starts to descend the gate will close, and since the contents will pass out through the opening 12, ordinary pressure on the piston will increase the velocity of the discharge against the upper edges of the middle blades causing further breaking of the egg yolk and increasing the tendency of the same to foam.

In Fig. 1 is shown a cap 19 similar to the cap or cover 3 of the piston. This member is provided with recesses similar to those formed in the collar already described, and adapted to perform a similar function. The cap is provided with a bottom 20 having a central opening coaxial with the opening of the cylinder and in which is fitted one end of an oblong nipple 21. The latter is circular in cross section and is provided throughout its length with a plurality of small annular openings arranged in circles. The nipple may be attached to the cap in any desired manner and in the present instance is shown to be of a diameter to slidingly fit through the opening of the cap having at its open end an annular flange 22 one face of which bears on the inner face of the cap bottom 20, while on the opposite face bears the outer face of the cylinder bottom 9. With this attachment the device may be used as a spray, or a means for whipping cream. In Fig. 1 is also shown a means for preventing the contents of an ordinary milk or cream bottle from splashing or soiling the operator when such a vessel is used in which to beat eggs or whip cream, and in the present instance is shown to consist of a disk 23, slidably fitting the cylinder 1. This disk is flat, and is designed to bear on and completely seal the opening of an ordinary milk or cream bottle. The disk has an upstanding marginal flange, and its opening, through which the cylinder passes, is surrounded by an upstanding flange 24, which bears on the outer surface of the cylinder, and serves to further prevent lateral movement of the cylinder during the operations already described.

From the foregoing it will be obvious that the device may be employed to perform many requirements, for instance with either attachment it may be inserted in a milk bottle and used to separate the cream from the body of milk, the lateral openings 25 formed adjacent the lower edge of the attachment 13 serving, as do the lateral openings of the nipple 21 to lessen the tendency of the milk to rise on the suction stroke, before the cream has been separated.

What is claimed is:—

A device of the character described comprising a cylinder having an opening at one end, a piston working therein, a valve pivoted within the cylinder and seating over the opening, said valve having an opening co-axial with, but of less diameter than the opening of the cylinder.

In testimony that I claim the foregoing as my own, I have hereto affixed my signature in the presence of two witnesses.

JOHN H. REED.

Witnesses:
GEORGE REED,
BELVA W. REED.